US006211789B1

United States Patent
Oldham et al.

(10) Patent No.: US 6,211,789 B1
(45) Date of Patent: Apr. 3, 2001

(54) METHOD AND SYSTEM FOR MANUAL ENTRY OF DATA INTO INTEGRATED ELECTRONIC DATABASE FOR LIVESTOCK DATA COLLECTION

(76) Inventors: Courtney A. Oldham, 4603 Park Stone Cir., Bryan, TX (US) 77802; Leland D. Curkendall, 1860 Lefthand Cir., Suite G, Longmont, CO (US) 80501

( * ) Notice: Subject to any disclaimer, the term of this patent is extended or adjusted under 35 U.S.C. 154(b) by 0 days.

(21) Appl. No.: 09/489,382

(22) Filed: Jan. 21, 2000

Related U.S. Application Data

(63) Continuation-in-part of application No. 09/036,564, filed on Mar. 9, 1998.

(51) Int. Cl.⁷ .................................................. G08B 23/00
(52) U.S. Cl. .................................... 340/573.3; 119/51.02
(58) Field of Search .......................... 340/573.3, 573.1, 340/825.34, 10.1, 505, 691.1, 815.65; 128/903; 119/51.02; 235/487; 283/74; 40/300, 301

(56) References Cited

U.S. PATENT DOCUMENTS

| | | | |
|---|---|---|---|
| 4,247,758 | * | 1/1981 | Rodrian .................................. 377/6 |
| 4,463,353 | * | 7/1984 | Kuzara .............................. 340/10.34 |
| 4,475,481 | * | 10/1984 | Carroll .............................. 119/51.02 |
| 4,854,328 | * | 8/1989 | Pollack .............................. 128/903 X |
| 5,235,326 | * | 8/1993 | Beigel et al. ....................... 340/10.41 |
| 5,252,962 | * | 10/1993 | Urbas et al. ...................... 340/870.17 |
| 5,315,505 | * | 5/1994 | Pratt et al. ........................ 128/903 X |
| 5,526,772 | * | 6/1996 | Curkendall ............................ 119/174 |
| 5,673,647 | * | 10/1997 | Pratt .................................. 119/51.02 |
| 5,857,434 | * | 1/1999 | Andersson ............................ 119/859 |
| 5,996,529 | * | 12/1999 | Sissom et al. ..................... 119/14.14 |
| 6,012,415 | * | 1/2000 | Linseth .................................. 119/174 |

* cited by examiner

Primary Examiner—Thomas Mullen
(74) Attorney, Agent, or Firm—Rick B. Yeager

(57) ABSTRACT

An efficient method and system for manual data entry into an integrated livestock management and data collection system is described to provide quality assurance source verification data and performance tracking for individual animals throughout the production cycle. The preferred embodiment includes a data card having a unique animal identification bar code for each animal; code cards showing abbreviated codes to be used when completing the data card; an individual animal radio frequency identification device having a unique code for the animal which corresponds to the unique animal identification bar code for the animal contained on the data card; a visual identification tag that contains a unique code to uniquely identify an animal; a bar coded event/detail listing; a bar code scanner for reading the bar codes on the data card; and BEEFLINK™ software as the integrated electronic database or system for processing and keeping track of the information.

20 Claims, 9 Drawing Sheets

| Data Card | | |
|---|---|---|
| DATE: 500 | | RANCH: 510 |

GROUP INFO BEING COMBINED WITH BELOW? ☐ YES~520 ☐ NO~530

VISUAL TAG #: 127   SEX: ☐ HEIFER~540 ☐ COW~550 ☐ STEER~560 ☐ BULL~570

Check all that apply:

| | BRAND~572 | METHOD~573 | DOSE~574 |
|---|---|---|---|
| 615 ☐ BRUCELLOSIS | 575 | 588 | 600 |
| 620 ☐ CLOSTROIDAL | 576 | 589 | 601 |
| 630 ☐ IBR | 577 | 590 | 602 |
| 640 ☐ PI-3 | 578 | 591 | 603 |
| 650 ☐ BVD | 579 | 592 | 604 |
| 660 ☐ BRSV | 580 | 593 | 605 |
| 670 ☐ HAEMOPHILUS SOMNUS BACTERIN | 581 | 594 | 606 |
| 680 ☐ PASTEURELLA | 582 | 595 | 607 |
| 690 ☐ LEPTOSPIROSIS | 583 | 596 | 608 |
| 700 ☐ DEWORM | 584 | 597 | 609 |

APPLY ANIMAL ID BAR CODE HERE   128

(Second side of CattleCode Data Card)

Check all that apply:     BRAND     METHOD     DOSE

- 710 — ☐ GRUB/LICE    585    598    610
- 720 — ☐ OTHER:    586    599    611
- 730 — ☐ IMPLANT    587

TREATMENTS:   740 — ☐ BRAND   760 — ☐ CASTRATE
            750 — ☐ DE-HORN   770 — ☐ WEAN

FRAME:   780 ☐1   790 ☐2   800 ☐3   810 ☐4   820 ☐5   830 ☐6   840 ☐7

CONDITION:   850 ☐1   860 ☐2   870 ☐3   880 ☐4   890 ☐5
               900 ☐6   910 ☐7   920 ☐8   930 ☐9

BIRTH DATE: _____940_____

COLOR:   950 ☐ BLACK   960 ☐ RED   970 ☐ WHITE
         980 ☐ BRINDLE   990 ☐ GREY
     1000 — ☐ BLACK WITH WHITE FACE
     1010 — ☐ RED WITH WHITE FACE

PREG:   1020 ☐1-2   1030 ☐3-4   1040 ☐4-5   1050 ☐6-7   1060 ☐8-9

BREED CODE: ___905___

SIRE CODE: ___910___

DAM CODE: ___920___

ANIMAL LOCATION: ___1105___

BROKEN NEEDLE?   1070 ☐ YES   1080 ☐ NO   IF YES, DESCRIBE (Where on animal, what vaccine/treatment, etc.)
___1090___
___1100___

OTHER: ___1110___
OTHER: _____

Code Card

METHOD:
IM = Intramuscular
SC = Subcutaneous
OR = Oral/Drench
PO = Pour On

BREED/SIRE/DAM:

A   = Angus
BM  = Beefmaster
BH  = Brahman
BA  = Brangus
C   = Charolais
CH  = Chianina
G   = Gelbvieh
H   = Hereford
PH  = Polled Hereford L   = Limousin
MA  = Maine Anjou
RA  = Red Angus
SA  = Salers
SG  = Santa Gertrudis
S   = Simmental
X   = Cross - Specify
      (i.e. AX Angus Cross)

FIG. 6

METHOD AND SYSTEM FOR MANUAL ENTRY OF DATA INTO INTEGRATED ELECTRONIC DATABASE FOR LIVESTOCK DATA COLLECTION

CROSS-REFERENCE TO RELATED APPLICATIONS

This application is a continuation-in-part of application Ser. No. 09/036,564, filed Mar. 9, 1998, entitled "Method and Apparatus for a Livestock Data Collection and Management System". That application is pending before the Patent and Trademark Office at the time of the filing of this application.

BACKGROUND—FIELD OF INVENTION

This invention relates to a method and system for enabling a non-automated livestock producer to enter information concerning a specific meat animal into an integrated electronic database such that the meat animal may be tracked from its conception to its consumption, and a particular animal history can provide both quality assurance source verification and performance tracking.

Overview

There is a need, for both economic and quality assurance reasons, for an efficient and cost-effective method for identifying and tracking livestock, and for the monitoring of the production and processing of those livestock. Throughout the livestock production and processing cycle, there is a need for more detailed information so that ranchers, stockmen, feedlots, packers, distributors and retailers can make informed decisions about factors and variables such as genetics, herd management, purchasing, feed strategies, and ship dates. Producers who improve their animal performance can realize greater returns with performance-based compensation when accurate information about the history and the value of each animal is easily available.

There is also a growing concern about quality assurance in the livestock processing cycle; and there is an opportunity for producers and processors who can establish that quality assurance to improve their compensation. Effective quality assurance programs such as HACCP, or Hazards Analysis and Critical Control Points, require accurate and timely information about the history of each animal.

The Beef Industry

The beef industry is a good example of the livestock industry. Traditionally, there are four segments to the U.S. beef industry: the cow/calf producer, the stockman, the feedlot, and the packer.

The commercial cow/calf producer has a herd of mother cows that are used to produce calves. The cows are bred to bulls so that, ideally, each cow has a new calf each year. The calf crop that is produced each year is used primarily for meat production, with some calves retained as replacements for the herd. The calves are usually weaned from their mothers at between six and eight months of age. The traditional producer will sell his animals once they are weaned. Typically, the main objectives of the producer are to have a calf from each cow each year; to have healthy, vigorous calves with the highest weaning weights at the lowest cost; and to produce the best meat, by factors such as tenderness and taste, at the lowest cost.

In order to support these objectives, the producer is interested in efficient systems for the following: (1) identifying and tracking individual animals as they rotate through the producer's pastures; (2) identifying which animals have a good calving history; (3) monitoring the performance of various pastures; (4) recording calf birth date and birth weight statistics; (5) tracking the genetic history of each animal; (6) evaluating the performance of calves from particular cows or bulls; (7) recording the weaning date and weaning weight of each animal; and (8) recording treatments, vaccinations, and other significant or events that have occurred in the animal's life.

The stockman receives the weaned calves when they weigh approximately 500 pounds, and feeds them for four to six months until they weigh 700 to 800 pounds. The stockman's typical objective is to add weight as fast as possible, while keeping the animals healthy. In order to support these objectives, the stockman is interested in the following: (1) collecting and using information such as identifying and tracking individual animals as they rotate through the stockman's pastures; (2) recording the beginning, ending, and periodic weight measurements and treatments; and (3) recording vaccinations and other significant events that have occurred in the animal's life in order to track of the success of treatments as well as to eliminate duplicate treatments.

After the stockman phase, the animals are typically sent to a feedlot where they are fed so as to add pounds quickly while keeping the animals healthy. The cattle will be finished when they reach a weight of approximately 1,100 to 1,200 pounds. The feedlot is interested in animal weight gain, animal health, the effectiveness of various feed ration formulations, required waiting periods on shipping animals after drug treatments, and animal origin and history. The animals are then sent to the packer/slaughter facility. The slaughter facility or packer typically slaughters the animal and then chills, ages and cuts the carcass into the various cuts of meat and packs those cuts for shipment to distributors and retailers.

Typically, each of these four segments, the cow/calf producer, the stockman, the feedlot, and the packer, have attempted to optimize their own operations, and there has been relatively little emphasis on cooperative optimization efforts. There is a growing recognition across these industry segments, however, that for both quality assurance reasons and for the improvement of the industry in general, it is desirable to attempt improved data collection and data management. An object of the present invention is to provide that improved data collection and data management.

Variability and Quality Control

There is variability in individual animal production efficiency and in individual carcass quality characteristics such as weight, frame size, muscling, fat content, marbling, and feed efficiency. This variation is due to a combination of genetic factors and environmental factors such as health and drug treatments, nutrition, and growth history. Many of the genetic and environmental factors can be controlled or managed to improve both quality and economic return on investment if accurate historical information were available throughout the production cycle.

The livestock industry has recognized that certain livestock species and breeds outperform other species during production and processing. The prior art has used data collection systems and statistical analysis of data related to livestock breeds in order to identify higher performance breeds. There is a need to extend this data collection so that individual producers can make informed decisions about individual breeding animals in order to further improve their herds.

BACKGROUND—DESCRIPTION OF RELATED ART INCLUDING INFORMATION DISCLOSED UNDER 37 CFR AND 37 CFR 1.98

Electronic Identification

Electronic identification devices and systems have provided a good method for providing identification of livestock. Typically, electronic identification systems use a passive electronic identification device that is induced to transmit its identification signal by an externally radiating source. These passive electronic identification devices may be a transponder carried with the individual animal on a collar as illustrated and described in Carroll U.S. Pat. No. 4,475,481, issued Oct. 9, 1984, entitled "Identification System" and in Kuzara U.S. Pat. No. 4,463,353, issued Jul. 31, 1984, entitled "Animal Feeding and Monitoring System"; in an ear tag such as those commercially available from Destron/Fearing, Inc., Allflex USA, Inc. and Avid Marketing, Inc.; in a transponder implanted in the animal as illustrated and described in Pollack U.S. Pat. No. 4,854,328, issued Aug. 8, 1989, entitled "Animal Monitoring Telltale and Information System" and in Hanton U.S. Pat. No. 4,262,632, issued Apr. 21, 1981, entitled "Electronic Livestock Identification System"; or in a bolus such as illustrated and described in U.S. Pat. No. 4,262,632, issued Apr. 21, 1981, entitled "Electronic livestock identification system" by John P. Hanton and Harley A. Leach.

Although electronic identification through radio frequency identification (RFID) tags or barcodes are used in some phases of the livestock production cycle, there is a need to provide a means for individual animal identification throughout the production cycle and to minimize the difficulty of data entry throughout the industry.

Databases and Management Systems

At different stages of the production cycle, there are different databases, which exist for different business purposes. The livestock producer will typically maintain his own database, a stockman will have an inventory system, a feedlot will have a management database, and a packer will have its own inventory and management system. There is a trend toward larger marketing alliance or national databases that include some data from each of these industry segments.

U.S. Pat. No. 5,322,034, which issued Jun. 21, 1994 to Richard L. Willham, for a "Livestock record system" describes a method for storing the individual animal's identification and performance data on a programmable electronic identification and data storage module carried with the animal. An object of the present invention is to provide a low-cost per animal system for obtaining and maintaining source verification and performance databases that are independent of the animal.

U.S. Pat. No. 5,315,505 issued to William C. Pratt on May 24, 1994 for a "Method and system for providing animal health histories and tracking inventory of drugs" describes a method and system for providing improved drug treatment to selected animals in a retained group. A computer system is used to provide an operator with the health and drug treatment history of an animal. With this information and a diagnosis of the animal's health condition, a drug treatment is chosen. The diagnosis and treatment are entered into the computer system to update the animal's health and treatment history. An object of the present invention is to provide complete source verification and performance databases for all key livestock events.

U.S. Pat. No. 5,673,647 for a "Cattle management method and system", issued on Oct. 7, 1997 to William C. Pratt, describes an automated method and system for providing individual animal electronic identification, measurement and value-based management of cattle in a large cattle feedlot. That method includes individual animal identification, a computer system, and multiple measurements coupled with a cattle handling and sorting system. An object of the Pratt patent was to build a feedlot data base to more accurately identify and measure characteristics such as weight, so that subsequent animals could be produced and fed for more effective value-based selection and management of the animals. In particular, that database related to calculations for economic management of feeding and shipping to permit optimum weight gains and feedlot ship dates. Whereas the feedlot patent disclosed identifying a particular animal on arrival at the feedlot, an object of the present invention is to track individual animals throughout the production and processing cycle.

SUMMARY OF THE INVENTION

Although it is possible to automate the identification and data entry, some of those involved in the livestock production and processing cycle are not equipped with the technology necessary for automation. The primary objective of this invention is to provide an animal identification method and system for those non-automated entities and persons involved in the production and processing of livestock. The present invention allows those persons and entities to identify their animals with electronic identification units, which are sometimes in the form of electronic identification transponders, boli, or radio frequency identification implants, and enter and collect information on that individual animal. These electronic identification units may be placed on the animal's ear in the form of an eartag; in the animal's stomach region as a bolus, or in the form of a collar.

Many non-automated persons or entities do not have electronic eartag readers, nor do they generally have software such as BEEFLINK™ data collection software. Often, however, these non-automated entities are associated with a group that will enter the information into an automated system such as BEEFLINK™ data collection software. An object of the present invention is to provide a means for accurately collecting information from non-automated sites, and entering the data which is collected with respect to individual animals onto automated systems such as BEEFLINK™ data collection software.

Another object of the present invention is to provide an effective data collection and database management methodology in the livestock industry including effective communication and sharing of data between those involved in the production and processing cycle. One result of this data collection and management invention is that quality assurance source verification data for individual animals will be available throughout the production cycle. This source verification will include the ability to implement HACCP plans. The source verification provides an opportunity for enhanced product value through improved quality assurance and food safety.

Another result of this data collection and management invention is that animal-specific performance information can be provided to the producer, the stockman, and the feedlot, and the packer so that those entities can make informed herd management and operational decisions. Improved information availability permits all segments of the livestock industry to reduce their cost of operations while improving product quality. The opportunities for process improvement range from avoiding duplicate treatments; to selecting more cost effective breeding stock; to selecting more cost effective feeds.

As part of the production process, other entities, which are not usually in the chain of title to an animal, also have an interest in a portion of the data. Veterinarians can access the health history, nutritionists can access the feed and health history, and bankers can know the location of their collateral. An object of the present invention is to employ authorization levels to designate what information may be made available to these entities.

Through the current invention, the complete history of an animal is available throughout the production and processing cycle, and both source verification and specific performance information are accessible.

Although the invention is described in the context of beef cattle, it is not so limited. It should be apparent to those skilled in the art that the invention can be modified, without departing from its principles, for other livestock including dairy cattle, swine, sheep, goats, and fowl.

DESCRIPTION OF THE SEVERAL VIEWS OF THE DRAWINGS

These and other features, aspects, and advantages of the present invention will become better understood with regard to the following description, appended claims, and accompanying drawings where:

FIGS. 5A and 5B are illustrations of the data card that is used for the system for manual entry.

FIG. 6 is an illustration of a code card that is used for the system for manual entry.

DETAILED DESCRIPTION OF THE INVENTION

This invention relates to manual entry of data into an integrated electronic database using a unique identification code for a particular animal. This invention enables a non-automated livestock producer to identify his or her animals with an electronic identification unit, collect information on each animal by completing a data card, and obtain performance information on the animals which were identified. Electronic identification units are widely used to accommodate data collection in the livestock production or processing business. The present invention allows a non-automated livestock producer to use an electronic database or system such that an efficient and cost-effective system and method of livestock data collection and data management provides quality assurance, HACCP compliance, and source verification data for individual animals throughout the production cycle. The resulting information will provide a basis for the producer, the stockman, the feedlot, and the packer to make informed herd management and operational decisions.

Figure 1:
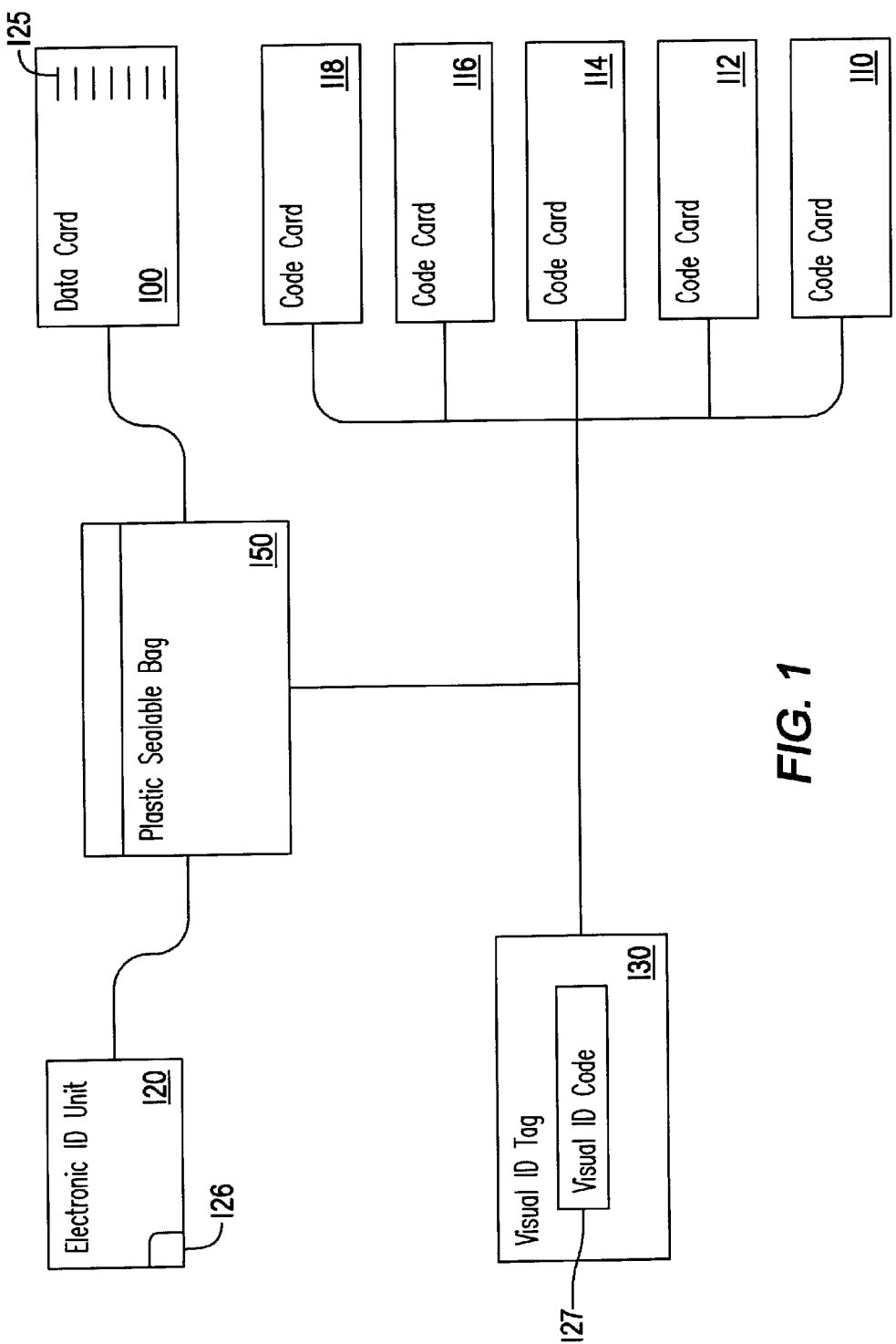
FIG. 1 illustrates the components sent to a livestock producer such that a livestock producer can manually record animal information.

Referring now to FIG. 1, the main components used for the data collection and management system in the preferred embodiment are packaged in a plastic resealable bag 150. The preferred components include a data card 100 having a unique animal identification bar code 125 for each animal; code card 110 showing abbreviated codes to be used when completing the data card 100; an electronic identification unit 120 having a unique code 126 for the animal which corresponds to the unique animal identification bar code 125 for the animal contained on the data card 100; a visual identification tag 130 having a unique code 127 that uniquely identifies an animal. In some embodiments of the invention, multiple bar code labels are used on the data card for unique animal identification.

The method for obtaining the non-automated rancher's information for entry into the electronic database or system includes: (1) enrollment of the livestock producer into the automated system; (2) manual data collection by the livestock producer pertaining to a specific animal; (3) efficient processing and entry of that data which was collected manually into an electronic database, largely by scanning bar codes.

Figure 2:
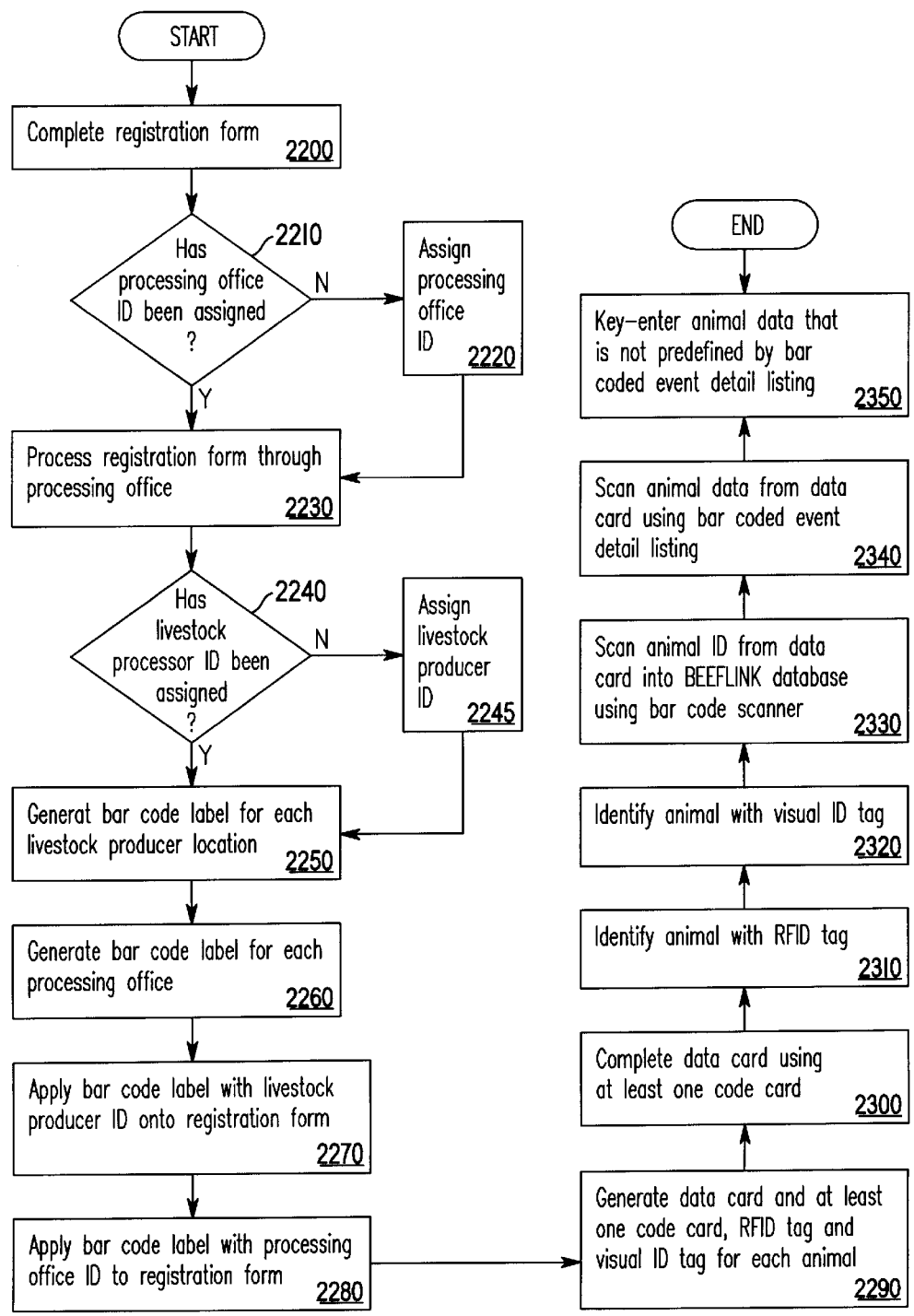
FIG. 2 is a flow chart illustration of the method for manual entry of information concerning a particular animal into the integrated electronic database.

Referring now to FIG. 2, the livestock producer begins the enrollment process into the automated system by completing a registration form at step 2200. If a processing office identification code has been assigned to the processing office at step 2210, then the registration form is processed through that processing office at step 2230. Alternatively, if a processing office identification code has not been assigned to the processing office at step 2210, then the processing office identification code is assigned at step 2220, and the registration form is processed at step 2230.

If a livestock producer identification code has not been assigned to the livestock producer at step 2240, then a livestock producer identification code is assigned at step 2245 and a bar code label containing that livestock producer identification code is generated for each livestock producer location at step 2250. Alternatively, if a livestock producer identification code has been assigned to the livestock producer at step 2240, then a bar code label containing that livestock producer identification code is generated for each livestock producer location at step 2250. A bar code label is generated showing the processing office identification for the processing office that is processing the registration form at step 2260. The livestock producer identification code is applied to the registration form at step 2270. The processing office identification code is applied to the registration form at step 2280. At step 2290, a radio frequency identification tag is read by a radio frequency identification reader and a bar code label for a pre-printed data card is generated, corresponding to the information from the tag, for purposes of animal identification. The data card containing the bar code label with the tag information, the tag from which the bar code information was generated and a visual identification tag are correlated so that they can identify an animal. The livestock producer completes the data card at step 2300. The animal is identified with the radio frequency identification tag at step 2310 and the visual identification tag at 2320. The bar code label containing the identifying data for the animal is scanned from the bar code label on the data card at step 2330. The animal data from the data card is scanned into the integrated electronic database of the BEEFLINK data collection software at step 2340. The information that could not be scanned is key-entered at step 2350.

Enrollment by Livestock Producer for Use of Electronic Database

Figure 3:
FIG. 3 illustrates a registration form used for registering a livestock producer in the system for manual entry of data.

A non-automated livestock producer enrolls for use of the electronic database by completing a registration form as described above. Referring now to FIG. 3, an illustration for such a registration form, the registration form 200 contains fields for the date 210; the billing address for the registering livestock producer 220; the billing phone number for the registering livestock producer 230; the fax machine telephone number for the registering livestock producer 240; the name of the site where the animal is located 250; the contact person at the site where the animal is located 260; the phone number at the site where the animal is located 270; the fax machine telephone number at the site where the animal is located 280; whether the data will be collected on individual animals 290 or a herd 300, or both individuals and a herd 310; and the livestock producer identification number which has been assigned to the rancher/livestock producer 320.

The registration form 200 is submitted by the livestock producer to a branch database management office, sometimes known as a "satellite", or the central database management office for processing. A livestock producer identification code 320 is assigned to a livestock producer for each location from which the livestock producer operates. The central office generates a bar code 330 containing the livestock producer's identification and that bar code corresponds to the livestock producer identification code 320. The livestock producer identification bar code 330 is affixed to the rancher's registration form 200.

Generating the Data Card and Code Cards

A data card is generated for each animal which the livestock producer desires to register. A code is also generated for the rancher's use. Referring back to FIG. 1, the data card 100, code card 110, the radio frequency identification tag 120, and the visual identification tag 130 are sent in a resealable plastic bag 150 to the livestock producer. The RFID tag 120, the visual identification tag 130, and the data card 100 each contain a unique code that identifies the same animal. The data card 100 with the unique animal identification bar code 125 is the means by which data is collected in a non-automated manner for entry into the electronic database. The code card 110 may be used to abbreviate some information.

Figure 4:
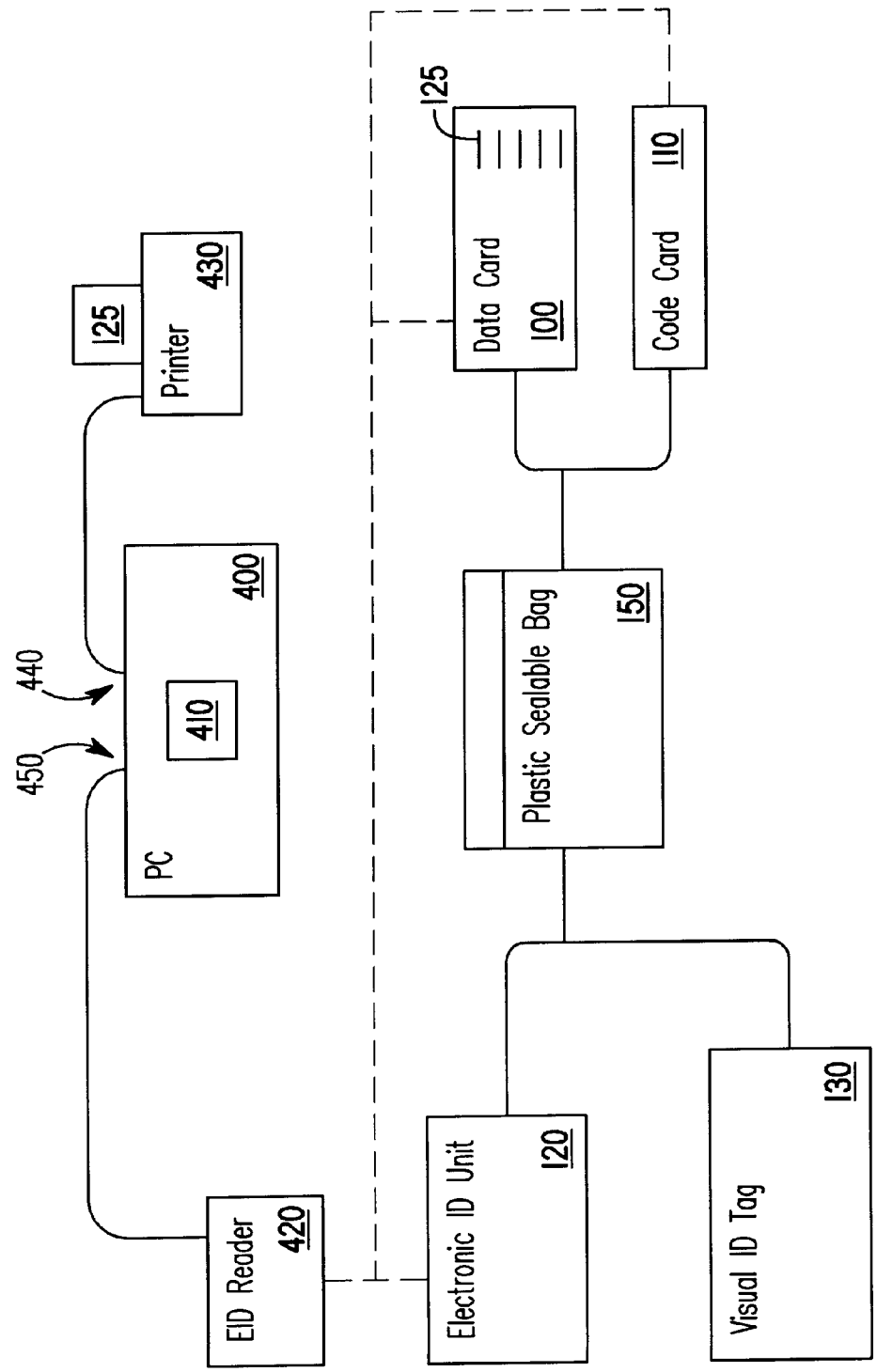
FIG. 4 illustrates the components used for packaging some of the elements for the system for manual entry, and the elements that are sent to the livestock producer for manual entry of data.

Referring now to FIG. 4, generating the data card 100, code cards 110 and bar code label 125 from the information on the electronic identification unit 120 for the system requires the following equipment: (1) a personal computer 400 with a software driver 410; (2) an electronic identification reader 420; (3) a printer 430; (4) a 2.75"×1.75" label for the bar code label 125 to be placed on the data card 100. Once generated, these items are placed into a 5"×7" plastic sealable bag 150 along with a 4"×6" pre-printed data card 100, at least one 4"×6" code card 110 and a visual identification tag 130.

The software driver 410 for the personal computer 400 may be obtained from a company such as AgInfoLink USA, Inc. in Longmont, Colo. The reader 420 may be obtained from a company such as Allflex. The printer 430 may be an Eltron 2242 printer and may be obtained from DataRep. The 2.75"×1.75" label that is to hold the bar code containing the animal's identification 125 may be obtained from DataRep also. The plastic bag 150 may be a zip lock bag obtained from U-Line. The data card 100 and code card 110 may be obtained from a local printer.

The printer 430 and electronic identification reader 420 are connected to serial ports 440 and 450, respectively, on the personal computer 400. The personal computer 400 formats incoming data from the electronic identification reader 420 to the format required by the printer 430. The electronic identification unit 120, also known as an individual animal radio frequency identification tag, is read with the electronic identification reader 420. A bar code label 125 containing the information from the electronic identification unit 120 is generated on the printer 430. The label 125 is taken from the printer 430 and applied to the data card 100 in the space 128 indicated for same. The electronic identification tag 120, the data card 100 with its corresponding bar code 125, and code cards 110 are placed in the plastic bag and sealed. Preferably, a visual identification tag 130 containing a unique code for the animal is also included in the bag. The visual identification tag would be used to identify the same animal as the animal for which the individual animal radio frequency identification tag and the bar code are assigned.

Manual Data Collection

By manually filling out a data card, this system allows ranchers to electronically identify and track an individual animal using an individual animal radio frequency identification tag 120 having a unique electronic identification code for each animal.

The manual data collection system is comprised of an individual animal radio frequency identification tag 120 and a pre-printed, two-sided, 4"×6" data card 100 which are packaged in a 5"×7" plastic bag 150. The manual data collection system should also contain a visual identification tag 130 that also uniquely identifies an animal. The plastic bags should be opened by the livestock producer one at a time to ensure accuracy since the data card 100, the individual animal radio frequency identification tag 120, and the visual identification tag 130 are linked with the same animal. Typically, the individual animal radio frequency identification tag 120 is an electronic identification transponder, a rumen bolus, or a radio frequency identification implant and uniquely identifies the animal assigned with its identification code. Typically, electronic identification transponders are placed through the animal's ear; a rumen bolus is typically placed in the animal's stomach region; a radio frequency identification implant may be placed on any part of the animal's body.

Referring now to FIG. 5A, the data card 100 has a space for a bar code label 128, and the applied bar code label will correspond to the animal's unique electronic identification code contained on the electronic identification unit. Preferably, the bar code label uses the same alphanumeric code that is contained on the animal's radio frequency identification transponder. Alternately, this correspondence can be effected using any other code, e.g., numerical, alphabetical, or alphanumeric, that is correlated back to the identifing code at the database. The individual animal radio frequency identification tag and data card 100 must remain together to ensure accuracy since they are linked with the same unique identification code.

The preprinted data card 100 is two-sided and has fields such that certain specific information may be filled in regarding the animal. Each field may be in the form of a blank, in which case the livestock producer writes in the information. Alternately, the field may be in the form of a box, in which case the livestock producer checks the box. As illustrated in FIG. 5, the front side of the data card 100 contains a field for the date 500 which is the date the animal is electronically equipped with an individual animal radio frequency identification tag. The data card also has a field for the ranch 510, meaning the ranch from which the animal is currently located. The data card has a field for the animal's visual identification tag number 127.

The data card further contains group information fields 520 and 530 which allow the livestock producer to check "yes" or "no" when answering the question of whether the particular animal is part of a larger group for which common information is being used. The livestock producer can save time by entering some common group information with respect to an entire group. If a set of events are being performed on a group of animals being identified and tagged by the rancher, then the livestock producer can complete a "Group Information Worksheet" which can be submitted along with each data card 100. The data card 100 also asks for the sex of the animal, which can be designated as "heifer" 540, "cow" 550, "steer" 560 or "bull" 570.

Vaccinations and medications are important information and the data card 100 contains fields for certain common specific vaccinations and medications used with respect to livestock, such that the livestock producer can indicate whether the animal is receiving any of the listed vaccinations or medications. The front side of the data card 100 also contains fields so that the livestock producer can insert the brand 572 at fields 575 through 584 (inclusive), the method 573 at fields 588 through 597 (inclusive), and dose 574 at fields 600 through 609 (inclusive) of each of the listed vaccinations/medications. These common vaccinations and medications include: Brucellosis 615; Clostroidal 620; IBR 630; PI-3 640; BVD 650; BRSV 660; Haemophilus somnus bacterin 670; Pasteurella 680; Leptospirosis 690; and Deworm 700.

Referring now to FIG. 5B, the back side of data card 100, the data card contains fields for indicating whether the animal has received a Grub/Lice 710 treatment, the brand of the Grub/Lice treatment 585, the method by which such a Grub/Lice treatment was administered 598, and the dose of the Grub/Lice treatment 610. Whether or not other vaccinations/treatments were administered may be indicated at field 720, as well as the brand 586, method 599 and dose 611 of such other vaccination/treatment. The method by which a vaccination or medication was administered may be abbreviated using the abbreviations shown on one of the code cards, e.g., 110 for method. As illustrated in FIG. 6, at least one code card 110 is included with the items which were sent to the rancher. Preferably, there is at least one code card and the card lists abbreviations to be used when completing the data card. As illustrated in FIG. 6, the method by which a vaccination or treatment is administered may be abbreviated. For example, "IM" may be used to designate an intramuscular injection. Also, "SC" may be used to designate subcutaneous. "OR" may be used to designate "oral/drench". "PO" may be used to designate "pour on"

Referring back to FIG. 5B, the data card can be used to designate the brand of the implant 730 in the field for implant 587. The animal's treatments may be indicated in the fields for same as brand 740, dehom 750, castrate 760 and wean 770. The animal's frame may be rated with a rating from 1–7 with each rating having a different field as shown in FIG. 5B as 780, 790, 800, 810, 820, 830, and 840, respectively. Likewise, the animal's condition may be rated with a rating of 1–9, inclusive, as illustrated in FIG. 5B as 850, 860, 870, 880, 890, 900, 910, 920 and 930, respectively. The data card also has fields to fill in information on the breed 905, sire 910 or dam 920 information on the animal using abbreviations printed on the code cards, e.g., 110. Abbreviations may be used in the interest of time efficiency. Referring back to FIG. 6, the code card 110, the following abbreviations and their accompanying definitions may be used for the breed, sire and dam information as set forth in FIG. 6: "A"="Angus"; "BM"="Beefmaster"; "BH"="Brahman"; "BA"="Brangus"; "C"="Charolais"; "CH"= "Chianina"; "G"="Gelbvieh"; "H"="Hereford"; "PH"="Polled Hereford"; "L"="Limousin"; "MA"="Maine Anjou"; "RA"="Red Angus"; "SA"="Salers"; "SG"="Santa Gertrudis"; "S"="Simmnental"; "*X"="Cross", designating a cross-breed and can be used in conjunction with the actual breed designation, such as "AX"="Cross Angus".

Referring back to FIG. 5B, the data card 100 also includes a field for the animal location 1105, which is generally a pasture description or a pen number. Additional fields are indicated on the data card 100 including the animal's birth date 940, the animal's color as black 950, red 960, white 970, brindle 980, grey 990, black with white face 1000, or red with white face 1010. Pregnancy checks performed on the animal may be indicated in the fields of the data card for: pregnancy check at 1–2 months 1020, pregnancy check at 3–4 months 1030, pregnancy check at 4–5 months 1040, pregnancy check at 6–7 months 1050, and a pregnancy check at 8–9 months 1060. The data card 100 also has fields for indicating whether a broken needle has been found on the animal 1070, whether a whether a broken needle has not been found on the animal 1080, and if a broken needle was found, a field for indicating the vaccine or treatment for which the needle was found 1090. Other incidents may be indicated using the "other" fields as illustrated at 1100 and 1110.

The livestock producer can check and/or detail the applicable items listed on the data card while attaching individual animal radio frequency identification tags to the livestock. The livestock producer may also attach a visual identification tag to the animal. Preferably, the visual identification tag contains the same unique code as that on the individual animal radio frequency identification tag. Alternately, the visual identification tag may also contain any other identifying designation for the animal. However, the identifying designation on the visual identification tag must be correlated to the identification code contained on the individual animal radio frequency identification tag so that both codes uniquely identify the same animal. As the livestock producer equips the animals with these units, the livestock producer should complete any information on the data card which is applicable to the animal being electronically identified. In the interest of time efficiency, the livestock producer can specify information that is the same for all animals being tagged on the portion of the envelope which is designated as "common information". If the livestock producer would like to track information that is not listed on the card, the livestock producer may use one of the "other" fields 1100 and 1110 listed at the end on the back of the data card and a "common information" envelope which may be enclosed with the shipment. For example, if the livestock producer would like to record the animal's disposition, the livestock producer could write "Disposition-Gentle" on one of the "Other" fields 1100 and 1110.

Entry of Manually Collected Information into Electronic Database

Once the livestock producer has gathered information on the animal by completing the data card, the livestock producer will forward the data cards to the satellite processing office of the central processing office for entry into the integrated automated electronic database. Preferably, the integrated electronic program is BEEFLINK™ data collection software.

Figure 7:
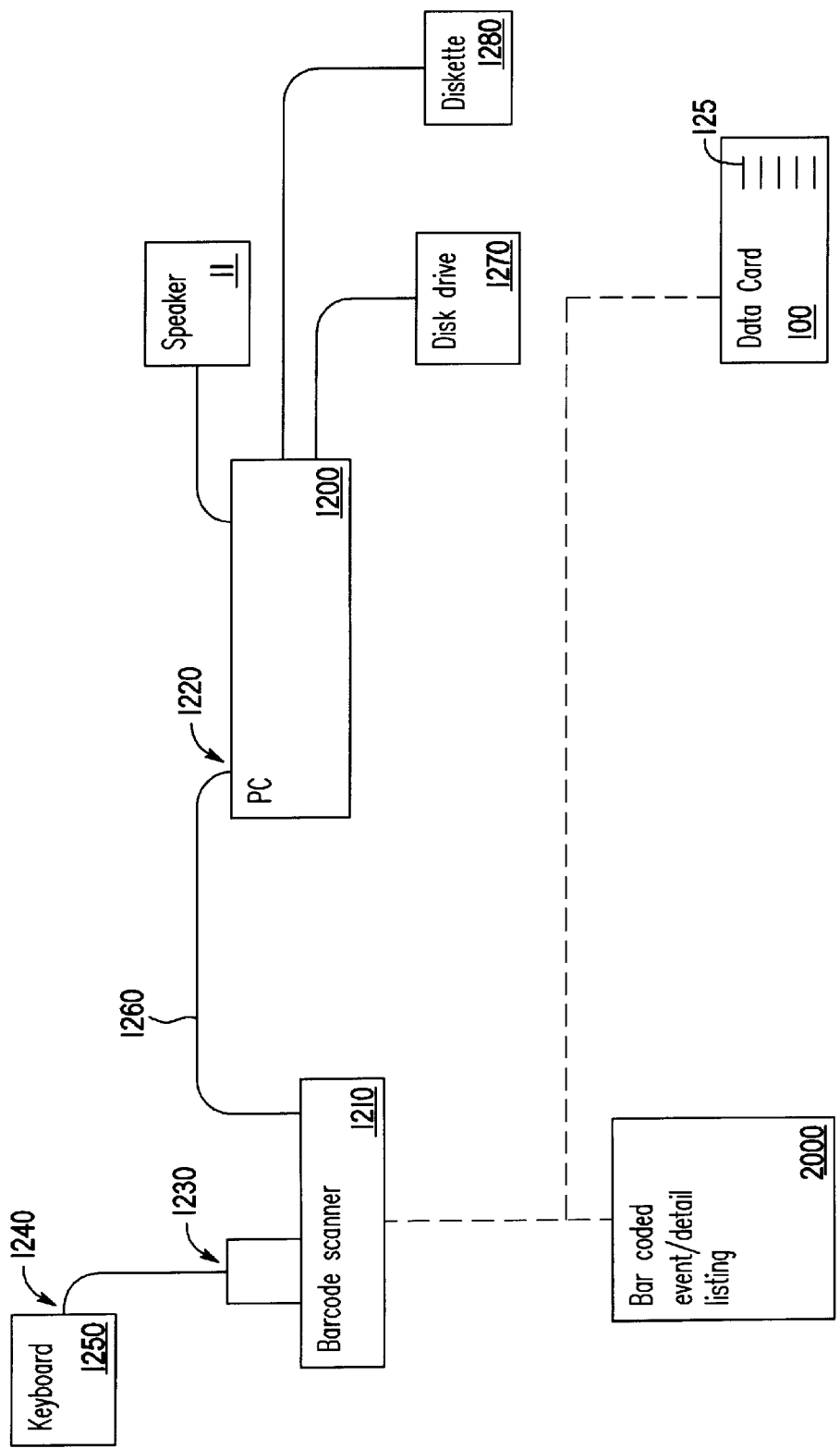
FIG. 7 illustrates the components used for entering the data collected from the data card into the integrated electronic database.

Referring now to FIG. 7, the animal's identifying data and other data from the data card will be processed under the livestock producer identification code. A bar code scanner 1210 and a bar coded event/detail listing 2000 may be used for much, if not all, of the information. The bar code scanner 1210 should be installed to the computer 1200 such that the unique animal identification bar code 125 on the data card and the bar coded event/detail listing 2000 can be read by using the following steps: make sure the computer 1200 is powered down; unplug the keyboard 1250 from the keyboard port 1220 of the computer 1200; connect the keyboard connector 1240 to the mating connector 1230 of the bar code scanner 1210; connect the second connector 1260 of the bar code reader to the keyboard port 1220 of the computer 1200; turn the computer 1200 on; enter a word processing program or other program that has a screen to view the key entered information; check to determine whether there is a problem with receiving data from the scanner and if there is a problem, check the keyboard 1250 to scanner 1210 and scanner 1210 to computer 1200 connections for proper connection.

Data Entry to BEEFLINK™ Data Collection Software

As noted in the preceding paragraph, BEEFLINK™ data collection software is the preferred integrated electronic database for the current invention. The BEEFLINK™ data collection software system is used for beef cattle and is easily adaptable to other livestock species, with the major change being the definition of industry-specific default events.

BEEFLINK™ data collection software is comprised of hardware and software to permit the user to scan ear tags, implants, collars, or boli with radio frequency identification scan readers; to scan bar codes; to enter new animals; to look up information on existing animals; to input new events; and to run queries on the work done. One objective of the software is to display pertinent data on each animal and add new events to the record in the least intrusive manner. The new animal records and events recorded are uploaded and incorporated into a larger database. Communication with the larger database allows the user to receive downstream animal performance data at his own computer.

The minimum components necessary to operate the system are as follows: a host computer which is an IBM-compatible desktop or laptop computer with WINDOWS™95 (or higher) operating system; 75 MHz 486 processor; 16 MB RAM; one serial port; 1 GB hard drive; 28.8 Kbps modem; 3.5" floppy disk drive; external power supply; MS-ACCESS™97 database software; BEEFLINK™ data collection software; a completed data card for each animal to be entered into the system; a bar code scanner for entering data into the database maintained by BEEFLINK data collection software; a bar coded event/detail listing for scanner entry of data from the data card into the database maintained by BEEFLINK data collection software; RFID electronic identification units for each animal to be entered into the system.

The preferred components of the system are as follows: a host computer which is an IBM-compatible desktop or laptop computer with Windows™95 (or higher) operating system; 166 MHz Pentium processor or higher; 32 MB RAM; one serial port; 2 GB hard drive or higher; 28.8 Kbps modem; 3.5" Floppy disk drive; CD-ROM drive; Sound card and driver; external speakers; external power supply with DC connection; PC-ANYWHERE™ remote access software; MS-ACCESS™97 database software; BEEFLINK™ data collection software; a completed data card for each animal to be entered into the system; a bar code scanner for entering data into the database maintained by BEEFLINK data collection software; a bar coded event/detail listing for scanner entry of data from the data card into the database maintained by BEEFLINK data collection software; RFID transponders on each animal.

Referring now to FIG. 7, which is a schematic of one embodiment of the integrated electronic database or system, the BEEFLINK™ data collection software runs on the host computer 1200 which may be either laptop or desktop computer. FIG. 7 illustrates a simple embodiment of the bar code scanner 1210 linked by connection 1260 to a host computer 1200. In this case, animal identification would be obtained from bar code 125 on the data card 100. The speaker 11 provides a feedback means to confirm the receipt of the animal identification from the bar code and animal data as scanned from the event/detail listing into the database at the host computer 1200. A disk drive 1270 is connected to the host computer 1200. A diskette 1280 which includes a file for defining the bar codes listed on the event/detail listing 2000.

Double-clicking the icon of the BEEFLINK data collection software on the Windows 95 Desktop display starts the BEEFLINK™ data collection software program. When the Company ID, the User ID, and the Password are entered on the Authorization Screen display, the program can be accessed.

Once authorization has been verified, a Command Center display permits graphical user interface navigation to the Data Collection Center, the Communications Center, the Report Center, or Housekeeping. The Housekeeping functions include Setup User Security, Password setup, and Program Defaults configuration such as units of measure, choice of language, and date formats.

The Data Collection Center permits equipment setup so that the BEEFLINK data collection software can receive data from multiple devices or output data to multiple devices.

Although the user may watch the results of his scans on the screen, it is not necessary to see the screen while processing animals. A feedback acknowledgement in the form of a light or sound may be sent to the user to indicate that the scans have gone through correctly. This feedback can be directed through a serial port to an external device. The feedback could also be generated through another device such as a data concentrator unit. Typically the user will get a positive feedback signal in the form of an audio acknowledgement when he reads an animal that exists. The user will also get the audio acknowledgement when he scans an event/detail.

When a new animal is scanned, the system cannot recognize the bar code identifying the animal 125 scanned so the user is signaled to re-scan the animal to verify that it was read. Upon receiving the verified scan, the system enters the new animal into the database. The new animal has only one piece of data so far—its unique code as represented by the bar code label. Other data is entered preferably with the bar coded event/detail listing.

If all of the animals being worked are new to the system, some defaults will probably be entered into the system. For instance, if all animals have the same estimated birth date, the date can be set as a default and added automatically to the birth date field of each new animal scanned. The same default function could be used for origin, location, or group.

If, however, the animals have varying birth dates or birth years, the available birth dates can be assigned to bar codes which previously had no designation. The user can use BIRTHDATE as the event and the date as the detail. As each animal is scanned, the correct birth date tag is scanned and assigned to the animal.

Steps for entering data from the data card to BEEFLINK™ data collection software include: verifying that the entity identification number is set up in the BEEFLINK™ data collection software program; placing the diskette which was included within the bar coded event/detail listing into the disk drive; running the only file on the disk, thus defining the bar codes listed and recognizing the bar codes by BEEFLINK data collection software. Next, determine whether there is information that is common to all cards by visually examining the data cards and if so enter all cards with the event "Group" and name the group in the "Detail" field. After all of the electronic identification bar codes have been entered along with the group event, perform the "Assign Group Events" within BEEFLINK™ data collection software for the common event. The bar coded event/detail listing 2000 will list the predefined events and details with the corresponding bar code. Rather than typing in events at the computer keyboard, the events may be scanned using the bar coded event/detail listing 2000. The bar coded event/detail listing is designed to assist the livestock producer with information from the data card. The bar coded event/detail listing 2000 features event/detail options, in generally sequential order, as they appear on the data card 100. The remainder of the bar coded event/detail listing 2000 includes a listing of the bar coded events/details that may be required to complete the "other" fields from the data card 100.

Figure 8:
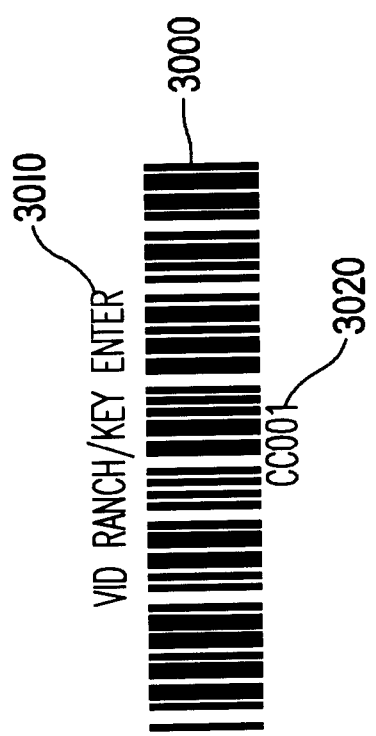
FIG. 8 illustrates a predefined bar coded event/detail, another component of the manual data entry system, which can be scanned to efficiently transfer animal data from the data card into the integrated electronic database.

Referring now to FIG. 8, an illustration of a bar code used for entering data, each event/detail code 3000 is comprised of a header 3010 identifying the event and/or detail definition for the bar code below the header. For example, the header 3010 for the bar code used to enter the animal's breed as angus would indicate on the header "Breed/Angus". A code identifier 3020 appears under the bar code. When a bar code cannot be read by the scanner, the code identifier may be keyed into BEEFLINK data collection software for the relevant event/detail when the user is prompted. Events with a detail of "KEY ENTER" will require key entry for the detail information. Blank bar codes, or codes without a header are allocated for the user to define the events/details that are frequently used but not defined in the bar code listing. The code identifier is the same as "TXP". Data entry time will be reduced by scanning events and details as opposed to key entry.

Now that BEEFLINK™ data collection software has been set up, the user is prepared to enter the data card information. The user enters the "Work Cattle-Start" section of BEEFLINK™ data collection software. The user then turns "Office Defaults" to "Off". The user is then prompted to "Scan TXP".

Referring back to FIG. 7, the animal identification bar code 125 is scanned from the data card 100. The user is then prompted to "re-scan". The animal identification bar code is then re-scanned from the data card. The user may then begin to scan the bar codes from the bar coded event/detail listing 2000 that correspond to the completed information on the data card 100. The user will then be prompted to key enter detail information. The user should then key enter detail information when prompted. Where "brand", "method" and "dose" are specified for vaccinations and medications, the user should enter the corresponding information together. For example, the codes for the BRSV vaccination should be scanned corresponding to the following headers in sequential order as follows:

VACCINATE/BRSV
DRUG MFG/KEY ENTER (enter manufacturer name)

-continued

METHOD/ (represents the method detail specified)
DOSE/ (represents the dosage specified)

Once the information is completed for a single data card, the user can proceed to the data card for the next animal by scanning the animal identification bar code for the new data card. Once all the cards for a group have been entered, the Group Events for that group of cards should be entered. The user should then return to the BEEFLINK™ data collection software Command Center. The user may send the information to others by applying Pony Express Relay Database™ to the information processed. Pony Express Relay Database is available commercially from AgInfoLink Global, Inc. Because of the bar code scanner interface, user definable events and details will be slightly more cumbersome. For ease and efficiency, labels can be made for frequently used events and details that do not appear in the bar coded event/detail listing. The label can be applied to blank pages at the end of the bar coded event/detail listing.

What is claimed is:

1. An apparatus to permit manual entry of information related to an individual animal into an integrated electronic database for livestock management and data collection, the apparatus comprising:
   a container including
      a livestock producer identification means for identifying a livestock producer location;
      an individual animal radio frequency identification device; at least one bar code label, wherein said bar code label is correlated with a particular individual animal radio frequency identification device such that one individual animal is uniquely identified by both said bar code label and said radio frequency identification device; at least one animal data card, said animal data card containing data fields in which characteristics specific to an individual animal may be recorded on the animal data card; and
      a visual identification tag having a visual identification code, wherein said visual identification code is correlated with a particular individual animal radio frequency identification device such that one individual animal is uniquely identified by both said visual identification tag and said radio frequency identification device.

2. An apparatus to permit manual entry of information related to a group of animals into an integrated electronic database for livestock management and data collection, the apparatus comprising:
   a livestock producer entity identification means for identifying a livestock producer location;
   a group information worksheet for recording characteristics common to the group of animals;
   a plurality of containers, each container including
      an individual animal radio frequency identification device; at least one bar code label, wherein said bar code label is correlated with a particular individual animal radio frequency identification device such that one individual animal is uniquely identified by both said bar code label and said radio frequency identification device;
      at least one animal data card, said animal data card containing data fields in which characteristics specific to an individual animal may be recorded on the animal data card; and a visual identification tag having a visual identification code, wherein said visual identification code is correlated with a particular individual animal radio frequency identification device such that one individual animal is uniquely identified by both said visual identification tag and said radio frequency identification device.

3. A method for manual entry of data into an integrated electronic database for livestock management and data collection comprising:

assigning a processing office identification code to each processing office, thereby identifying a processing office with a processing office identification code;

completing a registration form whereby a non-automated livestock producer is enrolled into an automated system, said registration form containing fields for identifying information and contact information for said livestock producer;

processing the registration form through a processing office; assigning a livestock producer identification code to each livestock producer location being registered, thereby identifying a livestock producer with a livestock producer identification code;

generating a livestock producer identification bar code label for each livestock producer location;

applying the bar code label for the livestock producer to the corresponding registration form;

generating a data card and at least one code card for each animal to be registered at a livestock producer location; completing a data card by supplying pertinent information on a particular animal, said data card having a unique animal identification bar code for identifying the animal;

identifying said animal with a unique individual animal radio frequency identification device having a unique electronic identification code which corresponds to the unique animal identification bar code on the data card; identifying said animal with a visual identification tag having a unique visual identification code which corresponds to a particular radio frequency identification device, such that one animal is uniquely identified by both the visual identification tag and the radio frequency identification device; and entering and storing the information from each animal's data card into an integrated electronic database.

4. The method of claim 3 wherein
the registration form includes fields for
the date;
the billing address for the registering rancher;
the billing phone number for the registering rancher;
the fax machine telephone number for the registering rancher;
the name of the site where the animal is located;
the contact person at the site where the animal is located;
the phone number at the site where the animal is located;
the fax machine telephone number at the site where the animal is located;
indicating whether the data will be collected on individual animals or a herd; and
the livestock producer identification code that has been assigned to the livestock producer.

5. The method of claim 3 wherein
said data card is completed using abbreviations for animal data contained on at least one code card.

6. The method of claim 3 wherein
the data card includes fields for
the date said data card is being completed;
the ranch on which the animal is located;
whether group information is being given on the animal;
the visual identification tag number for the animal;
the animal's sex as heifer, cow, steer or bull;
brand, method and dosage of medications and vaccinations for
Brucellosis,
Clostroidal,
IBR,
PI-3,
BVD,
BRSV,
Haemophilus somnus bacterin,
Pasteurella,
Leptospirosis,
Deworm,
Grub/Lice, and
Other,
brand of any implant;
treatments whereby the animal was branded, castrated, dehorned, or weaned;
an animal's frame rated as 1, 2, 3, 4, 5, 6, or 7;
an animal's condition rated as 1, 2, 3, 4, 5, 6, 7, 8, or 9;
an animal's breed code as such code is defined by the code cards;
an animal's sire code as such code is defined by the code cards;
an animal's dam code as such code is defined by the code cards;
an animal's location;
an animal's birth date;
an animal's color as black, red, white, brindle, grey, black with white face or red with white face;
pregnancy checks performed on the animal at 1–2 months, 3–4 months, 4–5 months, 6–7 months, and 8–9 months;
whether a broken needle is observed on the animal;
whether a broken needle has not been observed on the animal; and any incident other than a broken needle.

7. The method of claim 6 wherein said data card is completed using abbreviations for animal data contained on at least one code card.

8. The method of claim 3 wherein the individual animal radio frequency identification device is a radio frequency identification ear tag transponder unit which provides a unique electronic identification code when queried by a radio frequency identification reader unit and that code identifies a particular animal.

9. The method of claim 3 wherein the individual animal radio frequency identification device is a rumen bolus.

10. The method of claim 3 wherein the individual animal radio frequency identification device is a radio frequency identification transponder implant which provides a unique electronic identification code when queried by a radio frequency identification reader unit and that code identifies a particular animal.

11. The method of claim 3 wherein entering and storing the information from each animal's data card into an integrated electronic database includes the steps of:

scanning the animal's unique animal identification bar code into an integrated electronic database with a bar code scanner; and scanning the information contained on the data card into an integrated electronic database using a bar coded event/detail listing for predefined events.

12. The method of claim 11 wherein entering and storing the information from each animal's data card into an integrated electronic database includes the additional step of:
   key-entering information which is not predefined on the bar coded event/detail listing.

13. The method of claim 3 wherein entering and storing the information from each animal's data card into an integrated electronic database includes the additional steps of:
   verifying that the livestock producer identification code has been assigned and stored in a BEEFLINK™ data collection software program;
   entering and storing the information from each data card into a BEEFLINK data collection software program, including
      scanning the animal identification bar code;
      re-scanning the animal identification bar code;
      scanning the event/detail bar codes that correspond to the completed information on the data card.

14. A method for manual entry of data into an integrated electronic database for livestock management and data collection comprising:
   assigning a processing office identification code to each processing office submitting a registration form from a livestock producer;
   completing a registration form whereby a non-automated livestock producer is enrolled into an automated system, said registration form having fields for
      the date;
      the billing address for the registering livestock producer;
      the billing phone number for the registering livestock producer;
      the fax machine telephone number for the registering livestock producer;
      the name of the site where the animal is located that the livestock producer is registering;
      the contact person at the site where the animal is located that the livestock producer is registering;
      the phone number at the site where the animal is located that the livestock producer is registering;
      the fax machine telephone number at the site where the animal is located that the livestock producer is registering;
      whether the data will be collected on individual animals or a herd;
      the livestock producer identification code that has been assigned to the livestock producer;
   processing the registration form through a processing office;
   assigning a livestock producer identification code to each livestock producer location being registered;
   generating a livestock producer identification bar code label for each livestock producer location;
   applying to the corresponding registration form the livestock producer identification bar code label for the livestock producer;
   generating a data card and at least one code card for each animal to be registered;
   completing a data card by supplying pertinent information on a particular animal, said data card having a unique animal identification bar code for identifying the animal and fields for
      the date said data card is being completed;
      the ranch on which the animal is located;
      whether group information is being given on the animal;
      the visual identification tag number for the animal;
      the animal's sex as heifer, cow, steer or bull;
      brand, method and dosage of medications and vaccinations for
         Brucellosis,
         Clostroidal,
         IBR,
         PI-3,
         BVD,
         BRSV,
         Haemophilus somnus bacterin,
         Pasteurella,
         Leptospirosis,
         Deworm,
         Grub/Lice, and
         Other.
      brand of any implant;
      treatments whereby the animal was branded, castrated, dehorned, or weaned;
      an animal's frame rated as 1, 2, 3, 4, 5, 6, or 7;
      an animal's condition as 1, 2, 3, 4, 5, 6, 7, 8, or 9;
      an animal's breed code as such code is defined by the code cards;
      an animal's sire code as such code is defined by the code cards;
      an animal's dam code as such code is defined by the code cards;
      an animal's location;
      an animal's birth date;
      an animal's color as black, red, white, brindle, grey, black with white face or red with white face;
      pregnancy checks performed on the animal at 1–2 months, 3–4 months, 4–5 months, 6–7 months, and 8–9 months;
      whether a broken needle is observed on the animal;
      whether a broken needle has not been observed on the animal;
      any incident other than a broken needle;
   identifying said animal with a unique individual animal radio frequency identification device having a unique electronic identification code which corresponds to the unique animal identification bar code on the data card;
   identifying said animal with a visual identification tag having a unique visual identification code which corresponds to a particular radio frequency identification device, such that one animal is uniquely identified by both the visual identification tag and the radio frequency identification device; and
   entering and storing the information from each animal's data card into an integrated electronic database.

15. The method of claim 14 wherein the individual animal radio frequency identification device is a radio frequency identification ear tag transponder unit which provides a unique electronic identification code when queried by a radio frequency identification reader unit and that code identifies a particular animal.

16. The method of claim 14 wherein said data card is completed using abbreviated codes for animal data contained on at least one code card.

17. A system for manual entry of data into an integrated electronic database for livestock management and data collection comprising:
   a data card, said data card having a unique animal identification bar code which corresponds to a particular individual animal, the data card including fields for animal information including:

the animal's sex, breed, vaccination events, treatment events, and frame and condition scores;

at least one code card to assist the livestock producer in completing the animal information onto the data card;

an individual animal radio frequency identification device having a unique electronic identification code which corresponds to the unique animal identification bar code on said data card;

a visual identification tag having a visual identification code which corresponds to an individual animal radio frequency identification device, such that the individual animal radio frequency identification device and the visual identification tag identify one particular animal;

an integrated electronic database;

a bar coded event/detail listing to assist in transcribing information to the integrated electronic database; and a bar code scanner.

18. The system of claim 17 wherein the integrated electronic database is maintained using BEEFLINK™ data collection software.

19. The system of claim 17, further comprising:

group information worksheet for recording characteristics common to the group of animals.

20. A process for packaging a system for manual entry of data into an integrated electronic database for livestock management and data collection comprising:

connecting a printer to a serial port on a compatible data processor;

connecting an electronic identification reader to a serial port on a compatible data processor;

formatting the incoming data from the electronic identification reader to the format required by the printer;

generating a bar code label from the reading of an individual animal radio frequency identification device on the printer such that the bar code label can be used to identify a particular animal;

applying the bar code label used to identify a particular animal to a data card;

placing a data card, at least one code card containing abbreviations for animal data to be completed on the data card, the individual animal radio frequency identification device, and a visual identification tag for identifying the same animal, into a container such that the data card, said at least one code card, the visual identification tag and the individual animal radio frequency identification device are secured within the container.

* * * * *